(12) United States Patent
Ringgenberg

(10) Patent No.: US 7,252,437 B2
(45) Date of Patent: Aug. 7, 2007

(54) FIBER OPTIC WET CONNECTOR ACCELERATION PROTECTION AND TOLERANCE COMPLIANCE

(75) Inventor: Paul D. Ringgenberg, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 258 days.

(21) Appl. No.: 10/828,085

(22) Filed: Apr. 20, 2004

(65) Prior Publication Data

US 2005/0232548 A1 Oct. 20, 2005

(51) Int. Cl.
*G02B 6/36* (2006.01)
(52) U.S. Cl. .............................. 385/53; 385/55; 385/76
(58) Field of Classification Search ............. 385/53–87
See application file for complete search history.

(56) References Cited

U.S. PATENT DOCUMENTS

| | | |
|---|---|---|
| 4,134,455 A | 1/1979 | Read |
| 4,375,237 A | 3/1983 | Churchman |
| 4,442,893 A | 4/1984 | Foust |
| 4,483,584 A | 11/1984 | Gresty |
| 4,624,309 A | 11/1986 | Schnatzmeyer |
| 4,690,212 A | 9/1987 | Termohlen |
| 4,756,595 A | 7/1988 | Braun et al. |
| 4,757,859 A | 7/1988 | Schnatzmeyer |
| 4,825,946 A | 5/1989 | Schnatzmeyer |
| 4,828,027 A | 5/1989 | Schnatzmeyer |
| 4,846,269 A | 7/1989 | Schnatzmeyer |
| 4,887,883 A | 12/1989 | Darbut et al. |
| 4,921,438 A | 5/1990 | Godfrey et al. |
| 5,048,610 A | 9/1991 | Ross et al. |
| 5,251,708 A | 10/1993 | Perry et al. |
| 5,435,351 A | 7/1995 | Head |
| 5,505,260 A | 4/1996 | Andersen et al. |
| 5,577,925 A | 11/1996 | Schnatzmeyer et al. |
| 5,645,438 A | 7/1997 | Cairns |
| 5,645,483 A | 7/1997 | Cushman |
| 5,727,630 A | 3/1998 | Brammer |
| 5,778,978 A | 7/1998 | Crow |
| 5,803,167 A | 9/1998 | Bussear et al. |
| 5,831,156 A | 11/1998 | Mullins |
| 5,947,198 A | 9/1999 | McKee et al. |

(Continued)

FOREIGN PATENT DOCUMENTS

GB 2318397 4/1998

(Continued)

OTHER PUBLICATIONS

Office Action for U.S. Appl. No. 10/680,053, dated Nov. 8, 2004.

(Continued)

*Primary Examiner*—Kevin S Wood
(74) *Attorney, Agent, or Firm*—Marlin R. Smith

(57) ABSTRACT

Fiber optic wet connector acceleration protection and tolerance compliance. In a described embodiment, a fiber optic connection system for use in a subterranean well includes two assemblies, each having a fiber optic connector. A biasing device applies a biasing force which maintains the fiber optic connectors operatively connected to each other while the assemblies are secured to each other in the well.

22 Claims, 5 Drawing Sheets

U.S. PATENT DOCUMENTS

| | | | |
|---|---|---|---|
| 6,006,828 | A | 12/1999 | Kluth et al. |
| 6,017,227 | A | 1/2000 | Cairns et al. |
| 6,062,073 | A | 5/2000 | Patton et al. |
| 6,152,608 | A * | 11/2000 | Ghara et al. ................. 385/60 |
| 6,186,229 | B1 | 2/2001 | Martin et al. |
| 6,281,489 | B1 | 8/2001 | Tubel et al. |
| 6,302,203 | B1 | 10/2001 | Rayssiguier et al. |
| 6,325,146 | B1 | 12/2001 | Ringgenberg et al. |
| 6,332,787 | B1 | 12/2001 | Barlow et al. |
| 6,349,770 | B1 | 2/2002 | Brooks et al. |
| 6,378,610 | B2 | 4/2002 | Rayssiguier et al. |
| 6,439,778 | B1 | 8/2002 | Cairns |
| 6,464,405 | B2 | 10/2002 | Cairns et al. |
| 6,478,091 | B1 | 11/2002 | Gano |
| 6,527,052 | B2 | 3/2003 | Ringgenberg et al. |
| 6,568,481 | B2 | 5/2003 | Koehler et al. |
| 6,666,274 | B2 | 12/2003 | Hughes |
| 6,684,950 | B2 | 2/2004 | Patel |
| 6,736,545 | B2 | 5/2004 | Cairns et al. |
| 6,758,271 | B1 | 7/2004 | Smith |
| 6,758,272 | B2 | 7/2004 | Bixenman et al. |
| 6,766,853 | B2 | 7/2004 | Restarick et al. |
| 6,776,636 | B1 | 8/2004 | Cameron et al. |
| 6,837,310 | B2 | 1/2005 | Martin |
| 6,874,361 | B1 | 4/2005 | Meltz et al. |
| 6,933,491 | B2 | 8/2005 | Maida et al. |
| 6,951,252 | B2 | 10/2005 | Restarick |
| 6,983,796 | B2 * | 1/2006 | Bayne et al. ................ 166/278 |
| 2002/0014340 | A1 | 2/2002 | Johnson |
| 2002/0125008 | A1 | 9/2002 | Wetzel et al. |
| 2002/0162666 | A1 * | 11/2002 | Koehler et al. ............. 166/385 |
| 2003/0141075 | A1 | 7/2003 | Bixenman et al. |
| 2003/0192708 | A1 | 10/2003 | Koehler et al. |
| 2003/0196820 | A1 | 10/2003 | Patel |
| 2003/0213598 | A1 | 11/2003 | Hughes |
| 2004/0065439 | A1 | 4/2004 | Tubel et al. |
| 2004/0173350 | A1 | 9/2004 | Wetzel et al. |
| 2004/0256127 | A1 | 12/2004 | Brenner et al. |
| 2004/0256137 | A1 | 12/2004 | Bertini et al. |
| 2005/0092501 | A1 | 5/2005 | Chavers et al. |
| 2005/0109518 | A1 | 5/2005 | Blacklaw |

FOREIGN PATENT DOCUMENTS

| | | |
|---|---|---|
| WO | WO 86/02173 | 4/1986 |
| WO | WO 03/046428 | 6/2003 |
| WO | WO 2005/054801 | 6/2005 |

OTHER PUBLICATIONS

International Search Report for PCT/US04/01857.
Office Action for U.S. Appl. No. 10/680,625, dated Jan. 26, 2005.
Search Report for United Kingdom application No. GB 0507890.2.
Office Action for U.S. Appl. No. 10/680,053 dated Mar. 8, 2005.
Search Report for PCT/US04/01863.
Search Report for PCT/US04/01856.
U.S. Appl. No. 10/873,849, filed Jun. 22, 2004.
Norfolk Wire & Electronics, "Optical Fiber Splice Protectors-FSP", dated 2003.
Office Action for U.S. Appl. No. 10/680,625 dated Jun. 27, 2005.
Office Action for U.S. Appl. No. 10/680,440 dated Jul. 6, 2005.
Office Action for U.S. Appl. No. 10/680,053 dated Jul. 6, 2005.
Otis Engineering drawing No. 41UP58701 dated May 4, 1993.
Halliburton Energy Services drawing No. 42 oo 210 dated Apr. 7, 2001.
Halliburton presentation entitled, "DTS Conceptual Completions", Dec. 3, 2002.
Halliburton presentation entitled, "Greater Plutonio Completions Workshop", Mar. 12, 2003.
Office action for U.S. Appl. No. 10/680,053 dated Oct. 21, 2005.
Office Action for U.S. Appl. No. 10/680,053, dated Jun. 11, 2004.
U.S. Appl. No. 10/680,053, filed Oct. 7, 2003.
U.S. Appl. No. 10/680,625, filed Oct. 7, 2003.
U.S. Appl. No. 10/680,440, filed Oct. 7, 2003.
U.S. Appl. No. 10/790,908, filed Mar. 2, 2004.
The Expro Group brochure, "Tronic Fibre Optic Wellhead Feedthrough Connectors", undated.
Seacon brochure, "Fiber Optic Connectors", undated.
Ocean Design, Inc. brochure, "NRH Connector", undated.
Ocean Design, Inc. brochure, "Hybrid Wet-Mate", 2000.
Ocean Design, Inc. brochure, "I-CONN; Wet-Mateable Optical Connector", 2000.
Seacon Advanced Products data sheets, pp. 22-1 through 22-20.
Intelligent Wells, "Optical Fiber Technology," dated Oct. 2002.
Intelligent Wells, "Oil Field Applications of Hydroptics Technology," dated Oct. 2002.
World Oil, "World's First Multiple Fiber-Optic Intelligent Well," dated Mar. 2003.
Underwater Magazine, "Underwater Mateable Connectors in the Military and Telecom Sectors," dated Sep./Oct. 2002.
Sea Technology, "The Ruggedization of Hybrid Wet-Mate Connectors," dated Jul. 2000.
Sea Technology, "Optical Fiber and Connectors: Critical for Future Subsea Systems," undated.
OTC 15323, "The Development and Application of HT/HP Fiber-Optic Connectors for use on Subsea Intelligent Wells," dated 2003.
Journal of Petroleum Technology, "Development of HP/HT Fiber-Optic Connectors for Subsea Intelligent Wells," dated Aug. 2003.
Sea Technology, "Hybrid Wet-Mate Connectors: 'Writing the Next Chapter'," dated Jul. 1997.
Tronic, "Tronic Fibre Optic Wellhead Feedthrough Connectors," undated.
Tronic, "Firefly Project," undated.
OTC 13235, "Extending Tieback Distances: Wet-Mate Connectors, Enabling Technologies for Critical Systems Developments," dated 2001.
Ocean Design, "Underwater Mateable Connectors: Enabling Technology and the Next Step in Performance for Navy and Telecom Applications," Presented at Underwater Intervention Conference, 2002.
W Magazine, "Intelligent Well Completion, The Next Steps," dated Sep. 2002.
Production Optimization, "Intelligent Completions," undated.
Seacon, "Microstar, 4-Channel, Wet-Mate, Optical Connector," undated.
Ocean Design, Inc., "Ocean Design Introduces New I-Conn Product Line," dated Jul. 22, 2002.
Weatherford, "Intelligent Well Briefing," dated May 14, 2003.
"Pioneering Fibre Optic Completion Installation in the Mahogany Field, Offshore Trinidad," undated.
Pes, "Model FO Fibre Optic Orientating Disconnect Head," dated Oct. 23, 2000.
SPE 71676, "The Use of Fiber-Optic Distributed Temperature Sensing and Remote Hydraulically Operated Interval Control Valves for the Management of Water Production in the Douglas Field," dated 2001.
SPE 84324, "Brunei Field Trial of a Fibre Optic Distributed Temperature Sensor (DTS) System in a 1,000 m Open Hole Horizontal Oil Producer," dated 2003.
Halliburton, "X-Line® and R-Line® Landing Nipples and Lock Mandrels; Set and Lock Reliability in Subsurface Flow Control Equipment With a Total Completion Package", dated Mar. 1997.
Focal Technologies Corporation, Product Brochure for Model 286, dated Apr. 15, 2003.
Office Action for U.S. Appl. No. 10/680,440 dated Jul. 5, 2006.
Office Action for U.S. Appl. No. 11/038,369 dated Jul. 11, 2006.
International Preliminary Report on Patentability for PCT/US2004/001863.
International Preliminary Report on Patentability for PCT/US2004/001856.
International Preliminary Report on Patentability for PCT/US2004/001857.
Written Opinion for PCT/US2004/001863.
Written Opinion for PCT/US2004/001856.
Written Opinion for PCT/US2004/001857.

Office Action for U.S. Appl. No. 10/873,849 dated May 5, 2006.
Office Action for U.S. Appl. No. 11/038,369 dated Feb. 14, 2006.
Office Action for U.S. Appl. No. 10/680,625 dated Mar. 9, 2006.
Office Action for U.S. Appl. No. 10/680,440 dated Jan. 13, 2006.
Office Action for U.S. Appl. No. 10/790,908 dated Mar. 14, 2006.
Office Action for U.S. Appl. No. 10/680,053 dated Mar. 10, 2006.

* cited by examiner

FIBER OPTIC WET CONNECTOR ACCELERATION PROTECTION AND TOLERANCE COMPLIANCE

BACKGROUND

The present invention relates generally to equipment utilized and operations performed in conjunction with a subterranean well and, in an embodiment described herein, more particularly provides a fiber optic wet connector acceleration protection and tolerance compliance system and method.

It would be beneficial to be able to secure tubular strings to each other in a well, and also operatively connect fiber optic lines on the respective tubular strings. For example, a completion assembly could include a tubular string with gravel packed screens and a packer set at an upper end thereof. A production tubing string could then be conveyed into the well and latched to the completion assembly, so that longitudinal flow passages therein are placed in sealed communication.

The completion assembly could include sensors, etc. connected via an optical fiber to a fiber optic connector. The production tubing string could include an optical fiber extending from surface instrumentation to another fiber optic connector. The fiber optic connectors could be operatively connected to each other (for example, to permit optical communication between the surface instrumentation and the sensors, etc. of the completion assembly) when the production tubing string is latched to the completion assembly.

Unfortunately, existing systems and methods do not provide for several aspects of this operation. For example, most latches used to secure tubular strings to each other in a well allow some relative displacement between the strings after latching. A conventional latch may allow about 0.4 inch relative displacement due to design considerations and manufacturing tolerances. Typical fiber optic connectors only allow about 0.2 inch relative displacement while remaining operatively connected. Thus, the fiber optic connectors could be disconnected while the strings remain secured to each other.

As another example, when conventional latches are detached a relatively large tensile force is applied to a string, and then the latch releases. When the latch releases, the string experiences greatly accelerated displacement away from the other tubular string. This accelerated displacement would not permit sufficient time for a fiber optic connector to properly disconnect from another fiber optic connector. For example, a sealing mechanism of the fiber optic connector would not have time to completely close to prevent debris, etc. from entering the fiber optic connector.

Therefore, it may be seen that improved systems and methods for connecting and disconnecting fiber optic connectors are needed. These improvements may find use in a broad range of applications, including the application wherein tubular strings are secured to each other in a well as discussed above.

SUMMARY

In carrying out the principles of the present invention, in accordance with an embodiment thereof, a fiber optic wet connector system and method are provided which provide acceleration protection and tolerance compliance to resolve the above problems in the art.

In one aspect of the invention, a fiber optic connection system for use in a subterranean well includes two assemblies, each having a fiber optic connector. A biasing device applies a biasing force which maintains the fiber optic connectors operatively connected to each other while the assemblies are secured to each other in the well.

In another aspect of the invention, a fiber optic connection system for use in a subterranean well is provided which includes two assemblies, each having a fiber optic connector. The assemblies are releasably secured to each other in the well so that limited relative displacement is permitted between the assemblies while the assemblies are secured to each other. The fiber optic connectors remain operatively connected to each other during the limited relative displacement between the assemblies.

In yet another aspect of the invention, a method of operatively connecting fiber optic connectors to each other in a well is provided. The method includes the steps of: positioning first and second assemblies in the well, the first assembly including a first fiber optic connector, and the second assembly including a second fiber optic connector; then securing the first and second assemblies to each other in the well; operatively connecting the first and second fiber optic connectors to each other; and then permitting relative displacement between the secured first and second assemblies. The first and second fiber optic connectors remain operatively connected during the relative displacement between the secured first and second assemblies.

In a further aspect of the invention, a method of operatively connecting fiber optic connectors to each other in a well is provided. A tubular string is conveyed into the well, the tubular string having an assembly at an end thereof, and the assembly including a fiber optic connector. The assembly is engaged with another assembly in the well, the latter assembly being positioned at an end of another tubular string, and the latter assembly including another fiber optic connector. The engagement between the two assemblies aligns the fiber optic connectors with each other. The fiber optic connectors are operatively connected, and then the assemblies are secured to each other.

In a still further aspect of the invention, a method is provided which includes the steps of: securing a first assembly to a second assembly, the first and second assemblies including respective first and second operatively connected fiber optic connectors; disconnecting the first and second fiber optic connectors from each other in the well; and then detaching the first and second assemblies from each other in the well.

These and other features, advantages, benefits and objects of the present invention will become apparent to one of ordinary skill in the art upon careful consideration of the detailed description of a representative embodiment of the invention hereinbelow and the accompanying drawings.

DETAILED DESCRIPTION

Figure 1:
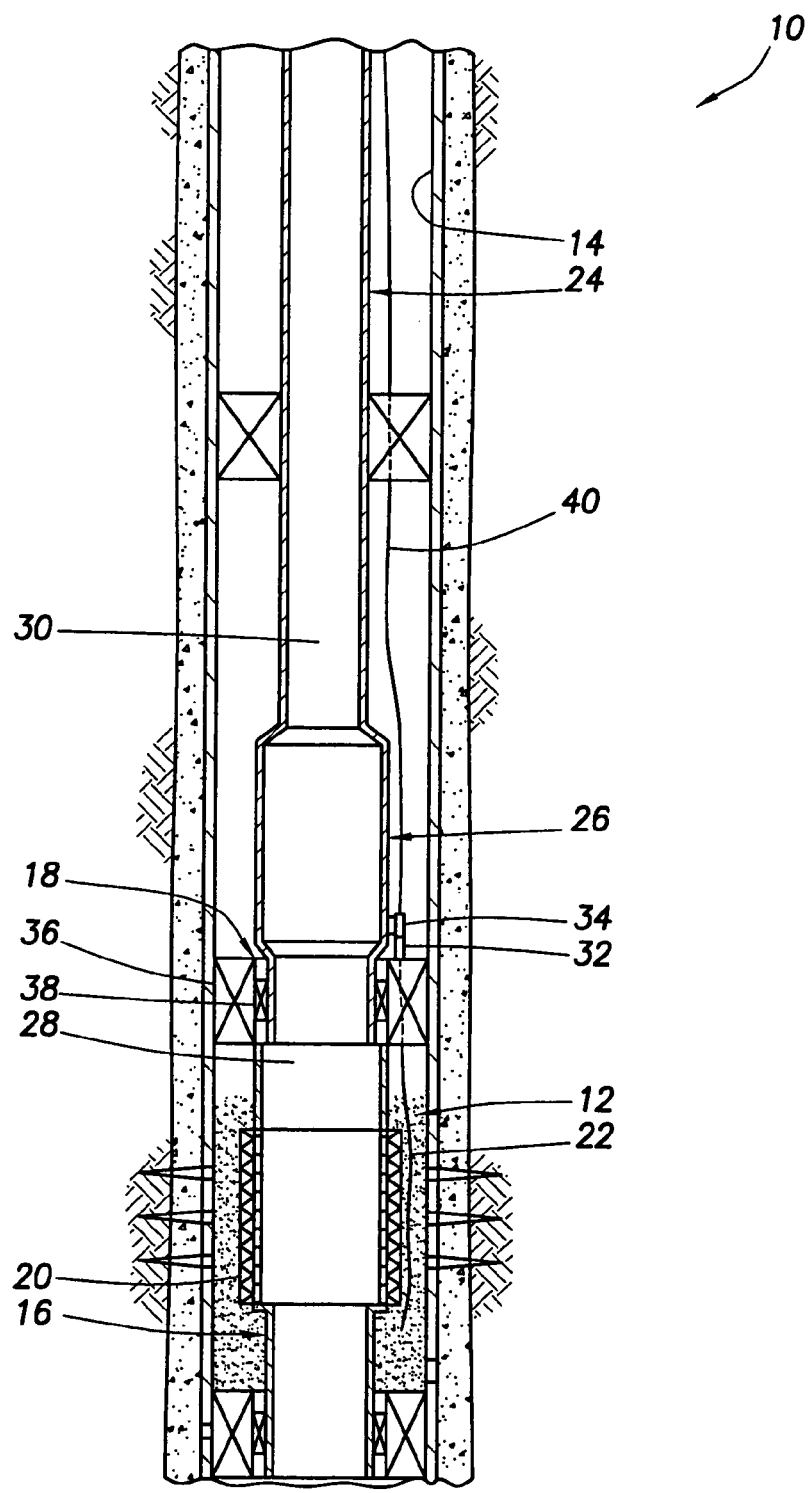
FIG. 1 is a schematic cross-sectional view of a fiber optic connection system and method embodying principles of the present invention.

Representatively illustrated in FIG. 1 is a fiber optic connection system 10 and associated method which embodies principles of the present invention. In the following description of the system 10 and other apparatus and methods described herein, directional terms, such as "above", "below", "upper", "lower", etc., are used for convenience in referring to the accompanying drawings. Additionally, it is to be understood that the embodiment of the present invention described herein may be utilized in various orientations, such as inclined, inverted, horizontal, vertical, etc., and in various configurations, without departing from the principles of the invention.

As schematically depicted in FIG. 1, a gravel packed completion 12 has been performed in a wellbore 14 of a well. The gravel packed wellbore 14 is shown as being cased, but the principles of the invention are also applicable in uncased wellbores. It is also not necessary in keeping with the principles of the invention for a wellbore to be gravel packed. Thus, it should be clearly understood that the details of the system 10 and associated method described herein are given merely as an example of a wide variety of applications in which the invention will find beneficial use.

The gravel packed completion 12 includes a tubular string 16 having a connector assembly 18 at its upper end, a screen 20 and an optical fiber 22. In this example, the optical fiber 22 serves as a distributed temperature sensor, which is used to monitor fluid flow in the wellbore 14 external to the screen 20. However, any other types of sensors may be used, the sensors could be otherwise positioned (such as, internal to the tubular string 16), and it is not necessary for sensors to be used at all in keeping with the principles of the invention (for example, the optical fiber 22 could be used instead, or in addition, for optical communication and/or telemetry purposes, etc.).

The connector assembly 18 is used, among other purposes, to connect the completion 12 to a production tubing string 24 conveyed subsequently into the wellbore 14. The tubing string 24 includes another connector assembly 26 at its lower end. When properly connected to each other, the assemblies 18, 26 provide for sealed communication between respective flow passages 28, 30 formed longitudinally through the strings 16, 24, operate to secure the strings to each other, and operatively connect respective fiber optic connectors 32, 34 of the assemblies 18, 26 to each other.

The fiber optic connector 32 is mounted above a packer 36 of the assembly 18 and is connected to the optical fiber 22. The fiber optic connector 34 is mounted externally above a latch and seal assembly 38 at a lower end of the assembly 26. The fiber optic connector 34 is connected to another optical fiber 40 which extends along the tubing string 24 to a remote location, such as the earth's surface or another location in the well.

The latch and seal assembly 38 engages a seal bore and latch profile in the packer 36, or associated therewith, in a manner well known to those skilled in the art. When the latch and seal assembly 38 has properly engaged the packer 36, the passages 28, 30 are in sealed communication with each other, and the strings 16, 24 are secured to each other. As discussed above, some limited relative displacement may still be permitted between the strings 16, 24, even though they remain secured to each other.

Figure 2:
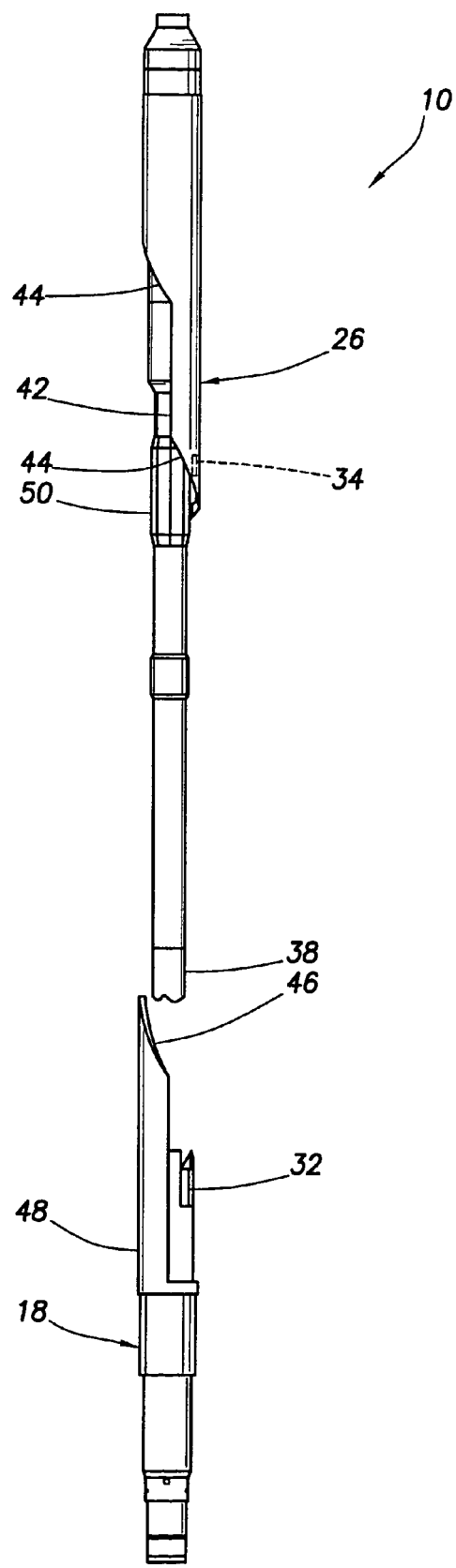
FIG. 2 is an enlarged scale elevational view of connector assemblies in the system of FIG. 1.

Referring additionally now to FIG. 2, the assemblies 18, 26 are shown apart from the remainder to the system 10. In this view, the manner in which the assemblies 18, 26 operate to rotationally align the fiber optic connectors 32, 34 may be more readily appreciated. Note that the upper fiber optic connector 34 is not visible in FIG. 2, since it is protected within an outer alignment housing 42 of the upper assembly 26.

The housing 42 has inclined surfaces 44 formed thereon which engage a complementarily shaped inclined surface 46 formed on an outer alignment housing 48 of the lower assembly 18. This engagement operates to rotationally align the housings 42, 48, thereby rotationally aligning the fiber optic connectors 32, 34. However, this is used merely as a relatively coarse alignment, as will be described in further detail below.

The assemblies 18, 26 are axially aligned when the latch and seal assembly 38 enters the passage 28 in the lower assembly 18. More precise axial alignment is provided when a radially enlarged alignment device 50 enters the lower assembly 18. Thus, it will be appreciated that the engagement between the assemblies 18, 26 serves to align the fiber optic connectors 32, 34 by both rotationally and axially aligning the assemblies.

The packer 36 is not shown in FIG. 2 for clarity of illustration, but in practice it would be connected below the housing 48. The latch and seal assembly 38 will preferably enter the packer 36 and be sealingly engaged therein prior to the rotational alignment of the assemblies 18, 26. In order to prevent rotating the latch and seal assembly 38 within the packer 36, the latch and seal assembly is preferably rotatable relative to the housing 42. Thus, when the housings 42, 48 are engaged with each other and rotate relative to each other to align the fiber optic connectors 32, 34, the latch and seal assembly 38 is not rotated within the assembly 18.

Figure 3:
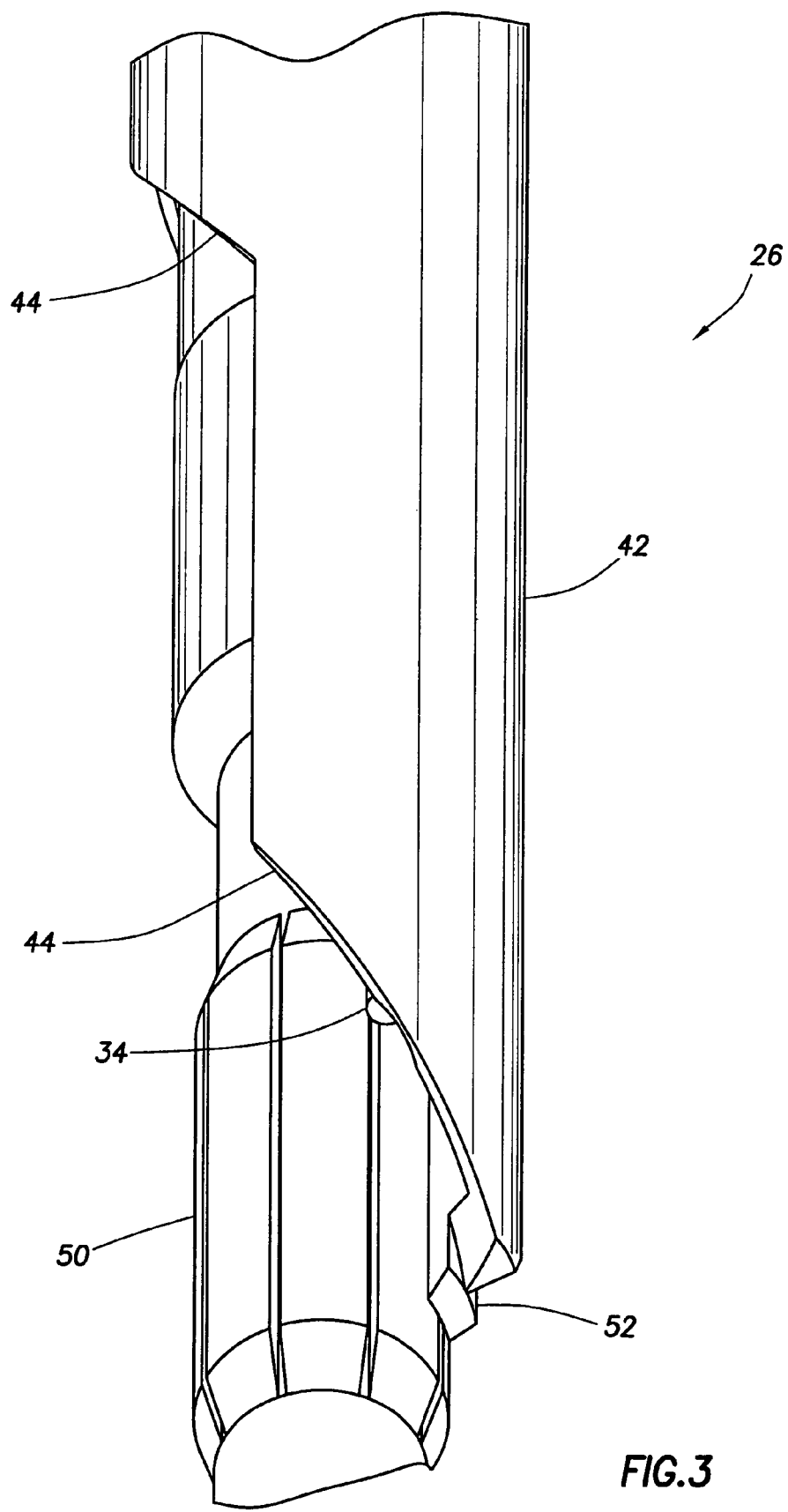
FIG. 3 is a further enlarged isometric view of an upper one of the connector assemblies.

Referring additionally now to FIG. 3, an enlarged isometric view of the assembly 26 is shown. In this view, the manner in which the fiber optic connector 34 is mounted within the housing 42 may be more clearly seen. Note that the connector 34 is protected by the housing 42 while the tubing string 24 is conveyed into the well.

Figure 4:
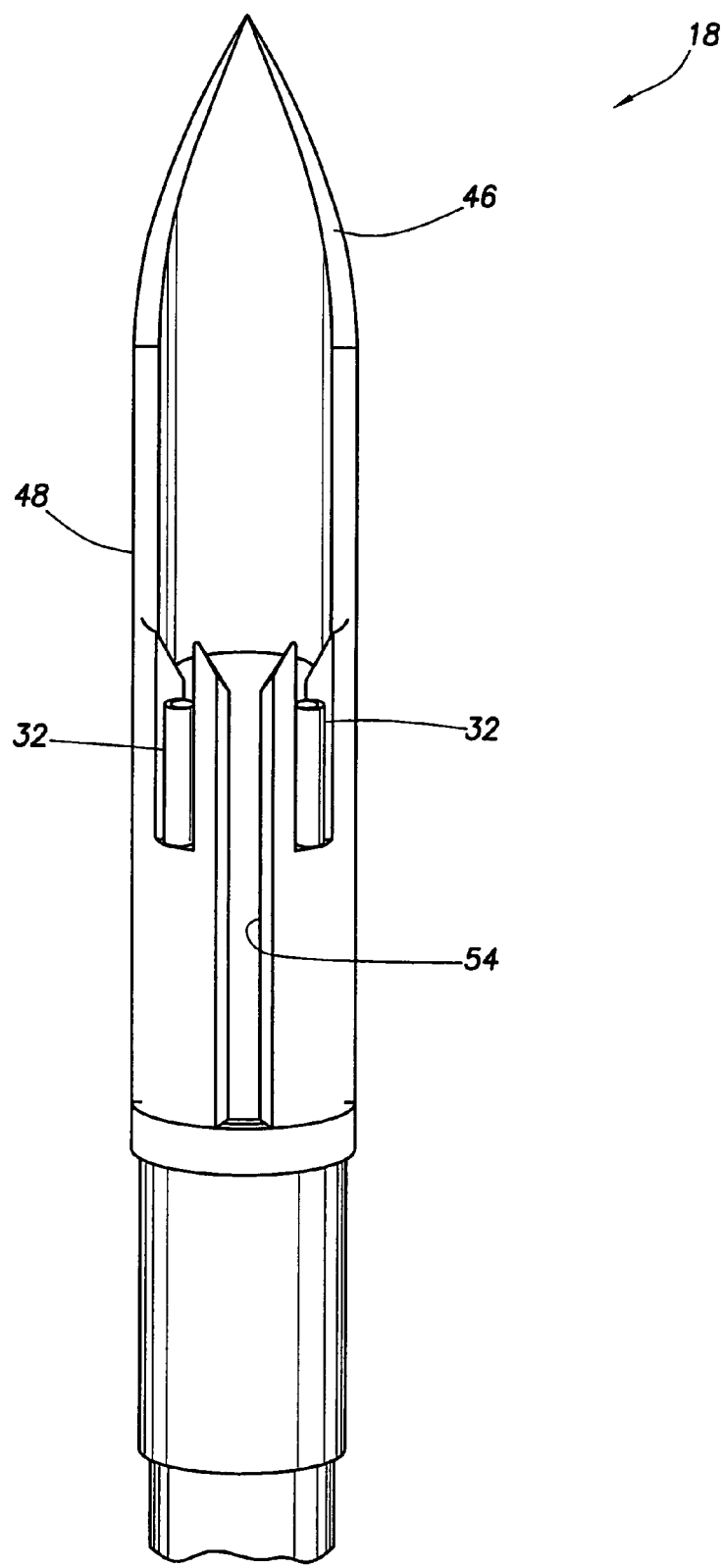
FIG. 4 is a further enlarged isometric view of a lower one of the connector assemblies.

In this view, the manner in which a more fine rotational alignment between the assemblies 18, 26 is achieved may also be seen. Note that the housing 42 has a longitudinally extending key 52 formed therein. Referring now to FIG. 4, a complementarily shaped keyway 54 formed on the housing 48 of the lower assembly 18 receives the key 52. This engagement between the key 52 and keyway 54 more precisely aligns the assemblies 18, 26, thereby more precisely aligning the connectors 32, 34.

In FIG. 4, it may also be seen that there are actually two of the lower fiber optic connectors 32 in the assembly 18. Similarly, there are two of the upper fiber optic connectors 34 in the assembly 26. Any number of fiber optic connectors may be used in keeping with the principles of the invention.

Figure 5:
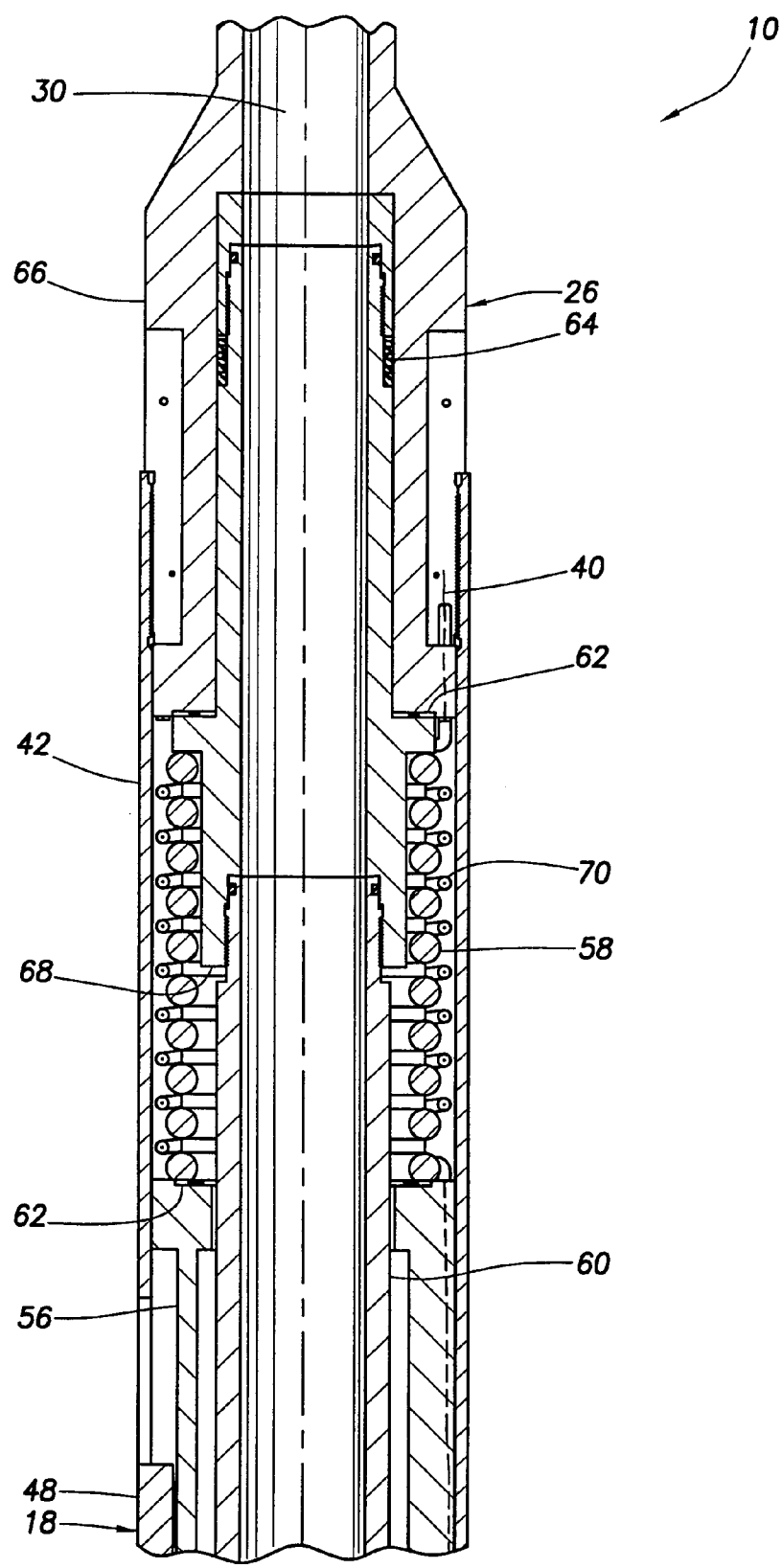
FIG. 5 is a cross-sectional view of the connector assemblies attached to each other.

Referring additionally now to FIG. 5, a cross-sectional view of an upper portion of the engaged upper and lower assemblies 18, 26 is shown. In this view may be seen the manner in which the connectors 32, 34 are operatively connected and disconnected when the strings 16, 24 are secured to each other and then detached from each other in the well (although the connectors themselves are not visible in FIG. 5). This manner of connecting and disconnecting the connectors 32, 34 prevents excessive acceleration at the time the connectors are disconnected, and maintains the connectors operatively connected even though the latch 38 may permit some relative displacement between the strings 16, 24.

The upper connector 34 (not visible in FIG. 5) is mounted at a lower end of a carrier 56 positioned within the housing 42. The carrier 56 is biased downwardly by a biasing device 58. The biasing device 58 is depicted in FIG. 5 as a coiled spring, but any type of biasing device (such as a compressed gas, elastomer spring, etc.) could be used to apply a downwardly directed biasing force to the carrier 56.

When the upper assembly 26 is engaged with the lower assembly 18 and the connectors 32, 34 are aligned, the connectors are operatively connected prior to the latch and seal assembly 38 securing the upper assembly 26 to the lower assembly 18. That is, the connectors 32, 34 are operatively connected, and then the strings 16, 24 are secured to each other.

As the assemblies 18, 26 are engaged with each other, the connectors 32, 34 are aligned and then operatively connected to each other (thereby permitting light transmission between the optical fibers 22, 40 connected to the connectors). Further engagement of the assemblies 18, 26 (for example, by further lowering of the string 24) causes the device 58 to longitudinally compress, which in this embodiment increases the biasing force applied to the connectors 32, 34. It is not necessary, however, for the biasing force to increase as the assemblies 18, 26 are engaged with each other.

To provide for the optical fiber 40 to extend through the assembly 26 to the connector 34 while the device 58 compresses and elongates, the optical fiber is contained within a tube 70. The tube 70 (such as a conventional hydraulic control line) is helically wound within the housing 42 outwardly disposed (and wound in an opposite direction) relative to the device 58.

Still further engagement of the assemblies 18, 26 causes the latch and seal assembly 38 to fully engage the packer 36 and thereby secure the strings 16, 24 to each other. If there is relative displacement between the strings 16, 24 while they remain secured to each other, the biasing force exerted by the device 58 on the connectors 32, 34 will maintain the connectors 32, 34 operatively connected to each other.

A tubular mandrel assembly 60 of the upper assembly 26 is received in the housing 42. The mandrel assembly 60 is connected to the latch and seal assembly 38. Note that the mandrel assembly 60 is rotatable within the housing 42, thereby permitting the latch and seal assembly 38 to rotate relative to the housing.

As discussed above, the latch and seal assembly 38 is permitted to rotate relative to the housing 42, so that as the connectors 32, 34 are being aligned by engagement between the assemblies 18, 26, the latch and seal assembly does not have to rotate within the packer 36. Bearings 62 are provided to facilitate such relative rotation between the mandrel assembly 60 and the housing 42. Also provided are seals 64 which seal between the mandrel assembly and the interior of an upper connector sub 66 of the assembly 26 as the mandrel assembly rotates relative to the housing 42.

When it is desired to detach the production tubing string 24 from the tubular string 16 of the completion assembly 12, a tensile force is applied to the production tubing string at the surface. This force is transmitted via the upper connector 66 to the housing 42 and carrier 56. When the tensile force overcomes the downwardly biasing force exerted by the device 58, the carrier 56 will displace upwardly, thereby removing the biasing force from the connectors 32, 34 and disconnecting the fiber optic connectors 32, 34 from each other.

When the fiber optic connectors 32, 34 are disconnected, the latch and seal assembly 38 remains operatively engaged in the packer 36. That is, the latch of the assembly 38 remains secured to the latch profile in the packer 36. The housing 42 and carrier 56 can displace upwardly somewhat to disconnect the connectors 32, 34 without the mandrel assembly 60 and latch and seal assembly 38 displacing therewith. This permits a relatively slow disconnect of the fiber optic connectors 32, 34 while the strings 16, 24 remain secured to each other, allowing the connectors to be properly disconnected (e.g., permitting proper operation of sealing mechanisms of the connectors to exclude debris, etc.).

Eventually, after the connectors 32, 34 have been disconnected, the carrier 56 will compress the device 58 sufficiently for the carrier to contact a downwardly facing shoulder 68 formed on the mandrel assembly 60. This will permit the tensile force applied to the production tubing string 24 above to be transmitted to the mandrel assembly 60. When sufficient tensile force has been applied to the mandrel assembly 60, the latch and seal assembly 38 will disconnect from the packer 36, thereby detaching the strings 16, 24 from each other. Note that, at this point the fiber optic connectors 32, 34 have already been disconnected, so acceleration of the production tubing string 24 as it detaches from the tubular string 16 does not cause improper disconnection of the fiber optic connectors.

Of course, a person skilled in the art would, upon a careful consideration of the above description of a representative embodiment of the invention, readily appreciate that many modifications, additions, substitutions, deletions, and other changes may be made to this specific embodiment, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A method of operatively connecting first and second fiber optic connectors to each other in a subterranean well, the method comprising the steps of:
    positioning first and second assemblies in the well, the first assembly including the first fiber optic connector, and the second assembly including the second fiber optic connector, and a respective optical fiber being connected to each of the first and second fiber optic connectors;
    then engaging the first and second assemblies with each other in the well;
    operatively connecting the first and second fiber optic connectors to each other, thereby enabling light transmission between the optical fibers; and
    then permitting relative displacement between the engaged first and second assemblies, the first and second fiber optic connectors remaining operatively connected during the relative displacement between the engaged first and second assemblies.

2. The method of claim 1, further comprising the step of securing the first and second assemblies to each other in the well, after the connecting step.

3. The method of claim 1, further comprising the steps of disconnecting the first and second fiber optic connectors from each other prior to disengaging the first and second assemblies from each other in the well.

4. The method of claim 1, wherein the connecting step further comprises rotationally aligning the first and second fiber optic connectors.

5. The method of claim 4, further comprising the step of engaging a seal assembly of the first assembly with the second assembly prior to the connecting step.

6. The method of claim 5, wherein the connecting step further comprises rotating the first fiber optic connector relative to the seal assembly after the seal assembly engaging step.

7. The method of claim 1, wherein the connecting step further comprises applying a biasing force to operatively connect the first and second fiber optic connectors.

8. The method of claim 7, further comprising the step of securing the first and second assemblies to each other in the well, after the biasing force applying step.

9. The method of claim 7, further comprising the step of removing the biasing force and operatively disconnecting the first and second fiber optic connectors prior to disengaging the first and second assemblies from each other in the well.

10. The method of claim 1, wherein the engaging step further comprises providing sealed communication between flow passages formed longitudinally through the first and second assemblies.

11. The method of claim 1, wherein the engaging step further comprises axially aligning the first assembly with the second assembly in the well.

12. A method of operatively connecting first and second fiber optic connectors to each other in a subterranean well, the method comprising the steps of:
conveying into the well a first assembly including a first fiber optic connector;
engaging the first assembly with a second assembly in the well, the second assembly including a second fiber optic connector;
operatively connecting the first and second fiber optic connectors, thereby enabling light transmission between optical fibers connected to the respective first and second fiber optic connectors; and
then securing the first assembly to the second assembly.

13. The method of claim 12, wherein the connecting step further comprises applying a biasing force to the first and second fiber optic connectors.

14. The method of claim 13, wherein the biasing force applying step is performed prior to the securing step.

15. The method of claim 13, wherein the securing step further comprises permitting limited relative displacement between the first and second assemblies while the assemblies are secured to each other, and wherein the biasing force maintains the first and second fiber optic connectors operatively connected to each other during the limited relative displacement.

16. The method of claim 13, further comprising the steps of removing the biasing force, then operatively disconnecting the first and second fiber optic connectors, and then detaching the first and second assemblies from each other in the well.

17. The method of claim 12, wherein the engaging step further comprises sealingly engaging a seal assembly of the first assembly with the second assembly.

18. The method of claim 17, wherein the engaging step further comprises rotating the first fiber optic connector relative to the seal assembly after the seal assembly has sealingly engaged the second assembly.

19. A method of operatively connecting first and second fiber optic connectors to each other in a subterranean well, the method comprising the steps of:
securing a first assembly with a second assembly, the first and second assemblies including respective first and second operatively connected fiber optic connectors, the operative connection between the first and second fiber optic connectors enabling light transmission between respective optical fibers connected to the first and second fiber optic connectors;
disconnecting the first and second fiber optic connectors from each other in the well, thereby disabling light transmission between the optical fibers; and
then detaching the first and second assemblies from each other in the well.

20. The method of claim 19, further comprising the step of applying a biasing force to the first and second fiber optic connectors, and wherein the disconnecting step further comprises removing the biasing force from the first and second fiber optic connectors.

21. The method of claim 20, wherein the disconnecting step further comprises removing the biasing force while the first and second assemblies remain secured to each other in the well.

22. The method of claim 19, further comprising the step of operatively connecting the first and second fiber optic connectors to each other, and wherein the connecting step is performed prior to the securing step.

* * * * *